Figure 1:
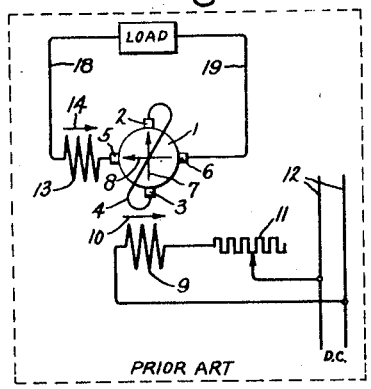

Sept. 27, 1949.    W. A. PRINGLE    2,483,151
DYNAMOELECTRIC MACHINE

Filed Nov. 14, 1947    2 Sheets—Sheet 1

Inventor:
William A. Pringle,
by Browell S. Mack
His Attorney.

Sept. 27, 1949.   W. A. PRINGLE   2,483,151
DYNAMOELECTRIC MACHINE
Filed Nov. 14, 1947   2 Sheets-Sheet 2
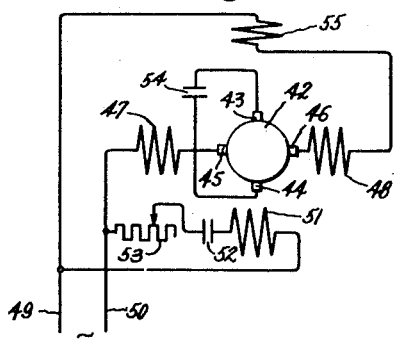
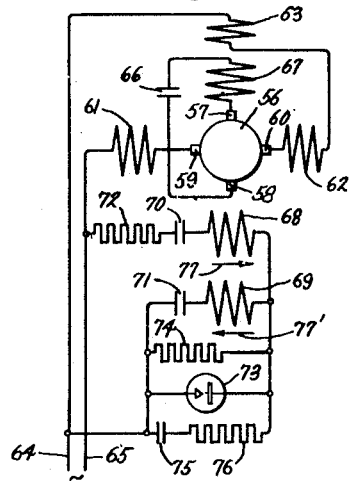
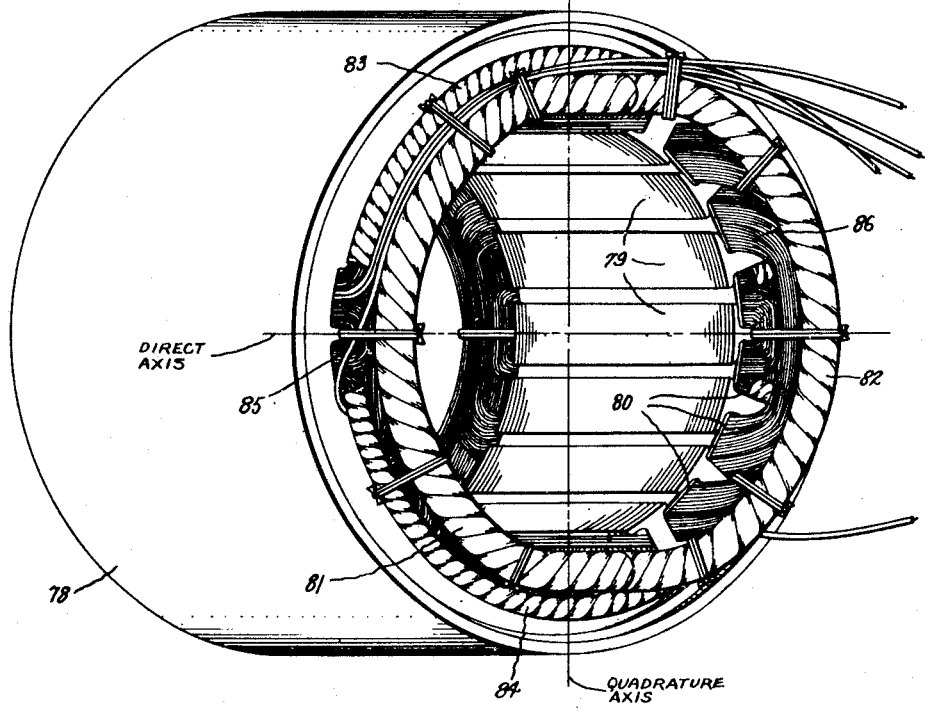
Inventor:
William A. Pringle,
by Purnell S. Mack
His Attorney.

Patented Sept. 27, 1949

2,483,151

UNITED STATES PATENT OFFICE 2,483,151

DYNAMOELECTRIC MACHINE

William A. Pringle, Fort Wayne, Ind., assignor to General Electric Company, a corporation of New York Application November 14, 1947, Serial No. 785,846

4 Claims. (Cl. 322—92)

This invention relates to commutating type dynamoelectric machines of the type in which the armature reaction of the machine provides a major source of excitation.

A dynamoelectric machine of the armature reaction excited variety normally comprises a rotor or armature having a winding and a commutator of the type used on conventional direct-current machines. The major component of excitation in this type of machine is provided by the armature reaction flux produced by current flowing in the armature winding. To facilitate the production of this armature reaction, a plurality of mutually displaced brush sets is provided, at least one set being connected to a low resistance circuit, amounting essentially to a short-circuit. Another set of brushes is connected to a load circuit when the machine is used as a generator or to a power supply circuit when used as a motor.

The stationary member of such a machine is arranged to provide a path of low reluctance for the various magnetic fluxes set up by the armature currents, and is provided with various windings to improve or control the operation of the machine. These stator windings include an exciting or control winding for inducing the voltage in the quadrature rotor circuit, which produces the heavy flow of current in the low resistance path provided, which in turn produces the desired main field, heavy armature reaction flux. In the most effective construction, a compensating winding is provided to neutralize substantially the armature reaction attributable to the current flowing to the load when the machine is used as a generator or from the power source when it is used as a motor. With such an arrangement, this type of dynamoelectric machine, used as a direct current excited generator, can be made by appropriate design of the various circuits to provide a variable voltage or variable current output with rapid response to adjustment of the control field excitation and a very high amplification ratio between the change in output and the change in input to the control field. When this type of machine is used as a direct current driven motor, the control field gives exceptionally accurate control of speed with low energy input and the machine is thus adaptable for use with simple low energy speed regulation systems.

A dynamoelectric machine of the type described above is generally referred to as an "amplidyne," the term referring to an armature reaction excited dynamoelectric machine having a control field winding, a low resistance quadrature circuit brush path, and a compensating winding for neutralizing the secondary armature reaction.

Dynamoelectric machines of the amplidyne type because of the high inherent inductance of the several field windings, have heretofore generally been considered as operable on direct-current only.

An object of this invention is to provide an improved dynamoelectric machine of the amplidyne type.

Another object of this invention is to provide an improved dynamoelectric machine of the amplidyne type which is operable on alternating current.

A further object of this invention is to provide an improved variable speed alternating current motor.

A still further object of this invention is to provide an improved alternating current generator wherein the frequency generated is independent of the speed of the machine.

Further objects and advantages of this invention will become apparent and this invention will be better understood from the following description referring to the accompanying drawings, and the features of novelty which characterize this invention will be pointed out with particularity in the claims annexed to and forming a part of this specification.

Figure 2:
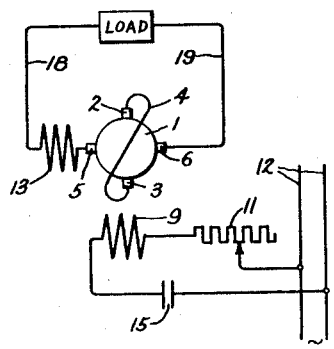
Figure 3:
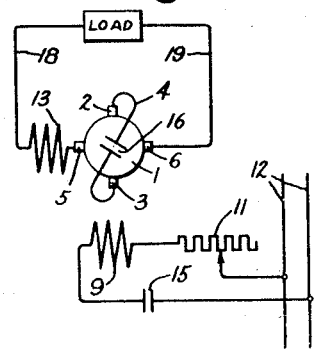
Figure 4:
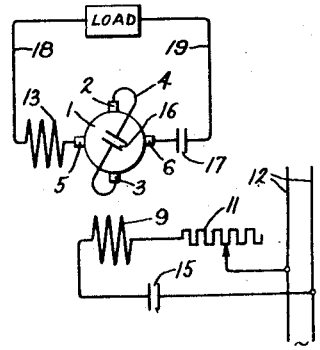
Figure 6:
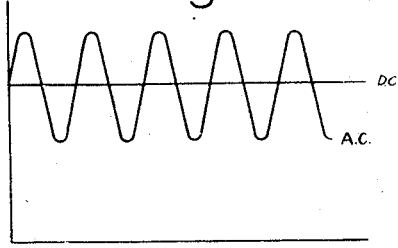
Figure 5:
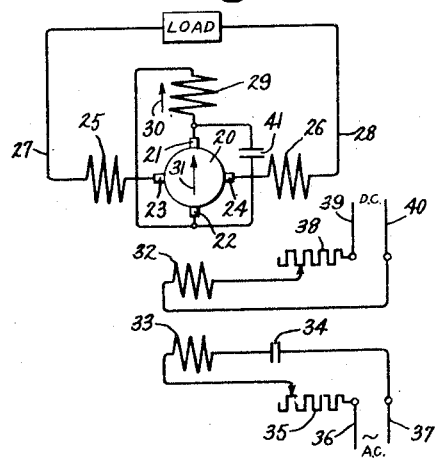
Figure 7:
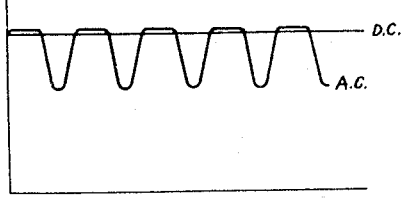

In the drawings, Fig. 1 illustrates a conventional direct-current amplidyne machine arranged as a generator, shown here for descriptive purposes only. Figs. 2, 3 and 4 show various ways of applying capacitative reactance in connection with an alternating current amplidyne generator in order to provide a machine operable on progressively higher frequencies. Fig. 5 illustrates a further form of this invention applied to an alternating current amplidyne generator and Figs. 6 and 7 illustrate voltage characteristics which may be generated by the machine of Fig. 5. Fig. 8 illustrates the application of this invention to an alternating current amplidyne motor, Fig. 9 illustrates a complete alternating current amplidyne motor circuit including a speed regulating system, and Fig. 10 illustrates the physical arrangement of the various windings in the stator of a typical alternating current amplidyne machine.

It is well known that a series direct current motor will run in the same direction if the polarity of the voltage applied is reversed. This result is due to the simultaneous reversal of field flux and armature current causing torque to be maintained in the same direction. For this reason, such a motor will operate on an alternating current supply. Moreover a direct current generator will generate a voltage of reversed polarity when the polarity of the field is reversed. This fact would indicate that it is entirely possible to operate an amplidyne-type motor on alternating current, or provide an amplidyne-type generator which will produce alternating current when the control field is excited by alternating current, if the inductive effect of the various windings can in some way be neutralized.

A feature of this invention which enables an amplidyne-type dynamoelectric machine to be operated on alternating current, is the provision of appropriately selected means for tuning the inductive windings of the machine. By the use of such means, it is possible by tuning the control and quadrature circuits of a machine, otherwise primarily usable as direct-current excited amplidyne-type generator with direct-current output, to operate the machine as an alternating current generator from an alternating current excitation source. When thus excited, the frequency of such a machine depends solely upon the frequency of the exciting agency, which may be a very low energy source such as a vacuum tube oscillator, tuning fork, etc., and is independent of the number of poles and speed of the machine. Accordingly, low energy alternating current can be greatly amplified without change of the original frequency and the alternating current output can be regulated or controlled by suitable low energy means using one or more control fields.

An equally important result of the application of the tuning principle to amplidyne-type dynamoelectric machines is the provision of an alternating current motor which can be run at any off-synchronous speed. The speed of such a machine does not depend on the number of poles and frequency of the power source, but depends primarily on the voltage applied, the amount of quadrature (main field) flux, load, windings, and temperature. Moreover, because of the high amplification inherent in an amplidyne motor, a very low energy speed regulating device can be used.

Referring now to Fig. 1, there is shown a conventional amplidyne generator of the type described in United States Patent No. 2,227,992 granted January 7, 1941, to Ernest F. W. Alexanderson and Martin A. Edwards and assigned to the assignee of the present application.

An explanation of the operation of this machine will provide a helpful introduction to the theory of operation of the present invention. The device shown in Fig. 1 comprises a generator provided with a rotatable member 1 having a commutator connected to an armature winding of the conventional direct current type and adapted to be driven by any suitable source of mechanical power (not shown). In this diagrammatic presentation, the stationary member supporting the pole pieces is also not shown. The armature is provided with a set of brushes 2 and 3 which are connected together by a short-circuiting conductor 4 to provide a low resistance primary or quadrature circuit through the armature 1. A set of secondary brushes 5 and 6 also contacts the commutator of armature 1 and is electrically displaced about the commutator from the primary brushes 2 and 3 providing a secondary or direct axis circuit through the armature. In order to obtain a substantially balanced distribution of electric currents through the various parts of the armature, the secondary brushes 5 and 6 are displaced 90 electrical degrees from the primary brushes 2 and 3. Since the primary brushes are short circuited, only a very small amount of flux is required to induce a voltage between these brushes to build up a relatively large primary current through that part of the armature winding which is connected between these brushes. This primary current will produce a magnetic flux or primary armature reaction along the primary axis as indicated by the arrow 7, the arrows being here shown representing the condition for a given polarity of the power source 12. As the armature 1 rotates, the conductors which are connected to the secondary brushes 5 and 6 will cut the primary armature reaction flux, produced as just specified, and a voltage will be induced between these brushes. If these brushes are connected to a load at terminals 18 and 19 a secondary or load current will flow through the secondary circuit of the armature producing a secondary armature reaction along the axis of these brushes as indicated by the arrow 8.

As explained above, only a very small amount of flux is required to build up a large current through the primary brushes 2 and 3. Therefore, in order to control the secondary output voltage of the generator, a field exciting winding 9 is arranged to provide the feeble magnetic excitation necessary to produce the main field or primary armature reaction flux. The excitation provided by this winding induces an electromotive force in the armature winding between the primary brushes 2 and 3 and thus produces a high primary current between these brushes by virtue of the short circuit connection 4. Any suitable means, such as a variable resistance 11 arranged in series with the winding 9, may be used to vary the energization of this winding from a source of direct current 12 so as to control the excitation produced by this winding.

The component of excitation produced by the control field winding 9 falls along the secondary commutating axis of the machine, as indicated by the arrow 10. As indicated above, the secondary armature reaction 8 falls on the same axis as the control field excitation 10. In the case of a generator, as shown here, the excitation provided by the control field opposes the secondary armature reaction, while in a motor, the secondary armature reaction and the control field excitation are cumulative. In order to provide a stable generator which is controllable by the minimum amount of control field excitation, it is essential that this secondary armature reaction 8 be completely neutralized. It is well known that the armature reaction produced by a flow of current between two brushes of commutator-type dynamoelectric machine will cause a voltage to be induced across another brush set displaced 90 electrical degrees from the first brush set. For this reason, the secondary armature reaction must be neutralized or a voltage will be induced between brushes 2 and 3 which is reversed in polarity and greater in value than the voltage induced due to the action of the control field 9, the result being to override and destroy the effect of the control field. The complete neutralization of this magnetic back-coupling is accomplished by providing a compensating field winding 13 wound in the stator, and generally distributed in winding slots to completely balance the secondary armature reaction at all points. This winding produces a component of excitation along the secondary commutating axis as indicated by the arrow 14. When a winding of this type having exactly the correct number of turns is connected in series with the secondary load brushes 5 and 6, the opposed mmf's 8 and 14 will exactly cancel out and heavy currents may be passed through this circuit without generating appreciable current due to back coupling in the low resistance circuit of brushes 2 and 3.

With the secondary armature reaction compensating system described above functioning properly, the control field 9 is only required to supply a relatively small excitation and may consequently be designed for a very low current input and a low ratio of inductance to resistance thereby increasing its speed of response and sensitivity of control. Thus, the armature excited generator can be made to have a high amplification factor since a relatively small amount of power is required for the control field exciting winding and the machine inherently has a high rate of response. As thus far described, the armature reaction excited machine shown in Fig. 1 is a direct current machine as shown in the referenced United States Patent No. 2,227,992 to Alexanderson et al. In the above machine, both the control current and the output current must be unidirectional or at most it has been found, can have a frequency not above 5 cycles.

In order to enable the direct current amplidyne generator described above to generate alternating current when excited by alternating current, the arrangement now to be described is provided. It has been found that a machine as shown in Fig. 1 will operate from 0 to 5 cycles with none of the circuits tuned. Referring now to Fig. 2, there is shown an arrangement which will operate satisfactorily from 5 to 20 cycles. Here, a capacitor 15 has been added in series with the control field 9 of the generator of Fig. 1. The inductance of the control field is such that it can be tuned with a capacitor of reasonable size, i. e., on the order of 40 mf., down to 5 cycles, on a machine with an output on the order of 1000 watts. At these low frequencies, it would be impractical to tune the quadrature axis, i. e., the primary circuit, it has been found that while 450 mf. is necessary to tune the quadrature circuit at 60 cycles, a capacitor of 65,000 mf. was necessary at 5 cycles.

When 18 to 20 cycles is reached, the reactance and resistance of the quadrature circuit are approximately equal and then it becomes desirable to utilize the circuit of Fig. 3 in which a capacitor 16 is added to the generator of Fig. 2 in series with the quadrature circuit, thus in effect replacing the short circuit connection 4 of Fig. 1 with a capacitor 16 on the order of 4000 mf. at 20 cycles to 450 mf. at 60 cycles connected across the primary brushes 2 and 3. It has been found that this arrangement will operate satisfactorily up to 200 cycles with decreases in the capacitor size as the frequency increases. Tests have shown that compensating field 13 effectively cancels out the reactance of the secondary armature circuit over the entire range of frequency.

When frequencies over 200 cycles are impressed on the control field 9, the leakage reactance of the secondary circuit becomes a factor and it is necessary to completely tune the machine as shown in Fig. 5. Here, capacitor 17 has been added to the generator of Fig. 3 in the secondary armature or load circuit. It will now be apparent that an amplidyne-type dynamoelectric machine with tuned circuits as described above, when utilized as a generator, will generate alternating current of a frequency independent of speed and due to the inherent amplification characteristics of this type of machine, excitation applied to the control field 9 from line 12 can be of relatively low power, i. e., on the order of 2 to 4 watts. This fact enables the machine to be utilized to generate alternating current over a wide range of frequencies (depending upon the availability of excitation of corresponding frequencies) with extremely accurate frequency regulation since the power requirements of the control field are sufficiently small to permit the machine to be excited from a precision frequency source such as a signal generator or crystal controlled oscillator with appropriate multi-vibrator and amplifier circuits.

Progressive tuning of the 3 winding circuits as described above, i. e., control field, quadrature, and direct axis, permits considerable flexibility of design of alternating current amplidyne generators since the proper amount of capacitive reactance can be provided in the appropriate circuits in accordance with the frequency output requirement.

With reference to Figs. 3 and 4 above, it will be apparent that with the control and quadrature circuits accurately tuned and the reactance of the armature direct axis neutralized by the compensating field or additional tuning, the generated output voltage will be in phase with the voltage applied to the control field. Due to the control field tuning, the control field current will be in phase with the control field voltage and the control field flux, being in phase with the control field current, will also be in phase with the control field voltage. The induced voltage on the quadrature brushes is proportional to and in phase with the control flux and, therefore, in phase with the control field voltage. The quadrature current is in phase with the quadrature voltage by virtue of the quadrature circuit capacitor and, therefore, the quadrature flux, being in phase with the quadrature current, is still in phase with control field voltage. The direct axis voltage is in phase with the quadrature flux and, therefore, also in phase with the control field voltage.

Referring now to Fig. 5, there is shown an arrangement which permits the generation of voltages or irregular wave shape. Here, the armature is shown at 20 with quadrature or primary brushes 21 and 22 and direct axis or secondary brushes 23 and 24. Compensating fields 25 and 26 are connected in series with direct axis brushes 23 and 24 respectively and are connected to the load at 27 and 28. In series with the quadrature, i. e., primary armature, circuit is quadrature field exciting winding 29. This field winding provides a component of excitation along the primary commutating axis shown by the arrow 30, in the same direction as the primary armature reaction, shown by the arrow 31. This winding, which may be of relatively few turns and hence of low reactance, is provided to improve the distribution of the quadrature armature reaction flux and also to reduce the value of current in the quadrature circuit. The armature reaction flux produced by current flowing through the quadrature armature winding as a result of the excitation of the control field has a substantially triangular distribution while the field flux distribution of the quadrature field winding 29 is substantially rectangular. Thus, the resultant superposition of the rectangular flux produced by the quadrature field on the triangular armature reaction flux, approximates a more uniform field; and also reduces the current which must be carried by the quadrature brushes 43 and 44 for a given field strength because the ampere turns added by the field 29 bring about a reduction of the total field current. This is due to the fact that the flux produced by the quadrature winding aids the primary armature reaction flux, and therefore the amount of primary armature current necessary to obtain a given secondary voltage will be reduced by the amount of current necessary to excite the winding 29. With this reduction in the requirement for current in the quadrature circuit, the excitation provided by the control fields 32 and 33 can be correspondingly reduced.

Control field exciting windings 32 and 33 are provided which may be excited by direct current and alternating current respectively, the alternating current winding 33 having a tuning capacitor 34 in series therewith. Alternating current field winding 33 is excited from an alternating current source 36 and 37 and variable resistance 35 serves to reduce the line voltage to the level necessary for control field 33. Direct current control field 32 is energized from direct current line 39 and 40 and variable resistance 38 reduces this line voltage to the desired value. Connected across the quadrature brushes 21 and 22 in parallel with quadrature winding 29 is the quadrature tuning capacitor 41. This parallel connection of the quadrature tuning capacitor is an alternative to the series tuning of Figs. 2 through 4.

This arrangement can be used to generate an alternating current voltage superimposed on a direct current voltage as shown in Fig. 6 on a flat topped wave form as shown in Fig. 7, the flat topped form being produced when the direct current field 32 is excited to saturation.

Referring now to Fig. 8, there is shown an embodiment of this invention applied to an amplidyne type dynamoelectric machine arranged as a motor. Here, the armature 42 is shown with quadrature brushes 43 and 44 and direct axis brushes 45 and 46. Compensating fields 47 and 48 are connected to an alternating current source of power at line terminals 49 and 50 and serve to neutralize substantially the secondary armature reaction due to current flowing between the direct axis brushes 45 and 46. The control field 51 is also excited from line 49 and 50 and is tuned by series capacitor 52. Variable resistance 53 in series with the control field serves to reduce the line voltage to a suitable value. The quadrature circuit is tuned by capacitor 54 arranged in the short-circuited path between the quadrature brushes 43 and 44. In this embodiment, a series starting field winding 55 is arranged in series with the direct axis brushes and compensating fields and wound in the stator in line with the quadrature brushes.

Here, current will flow from the line 49 and 50 through the direct axis circuit comprising the compensating fields 47 and 48, and the armature windings between the direct axis brushes 45 and 46. This flow of current produces a direct axis armature reaction, which however, is neutralized substantially by the compensating field windings. Series starting winding 55 provides an initial component of excitation in the same direction as quadrature armature reaction will ultimately assume. This initial flux provided by the series starting winding coacts with the current flowing in the direct axis circuit to produce the initial starting torque. Simultaneously with the flow of current in the direct axis circuit, the control field 51 will be energized. As the armature 42 begins to rotate responsive to the coaction of the direct axis current and flux provided by the series starting winding, the excitation of the control field will induce a voltage across the quadrature brushes 43 and 44. By virtue of the short-circuited connection between these brushes, a heavy flow of quadrature armature current results, producing the main field or quadrature armature reaction flux. This quadrature armature reaction flux coacts with the current flowing in the direct axis circuit to produce the motor running torque. Thus, with this arrangement, the machine starts in a manner analogous to a conventional series motor, but immediately upon starting is converted to and runs as an amplidyne-type motor.

It will be readily seen that the arrangement described above is similar to that shown in Fig. 3, except the direct axis brushes are connected to a source of alternating current power instead of a load. The speed of this motor is governed by the amount of excitation provided by the control field and is therefore adjusted by the variable resistor 53. Since the time constant in an amplidyne motor is inherently low, the speed of the motor can be varied rapidly over a wide range by means of a slight adjustment of the variable resistor 53.

It will now be apparent that an alternating current amplidyne motor will readily lend itself to speed regulation through the control field with a low energy regulator such as a contact governor, the governor being substituted for the variable resistor 53 of Fig. 8. Referring now to Fig. 9, there is shown an embodiment of this invention applied to an alternating current amplidyne motor system including a speed regulating circuit. Here, the armature 56 is provided with quadrature brushes 57 and 58 and direct axis brushes 59 and 60. Compensating fields 61 and 62 are connected in series with the direct axis brushes and series starting winding 63 across the alternating current power source 64 and 65. The quadrature circuit includes tuning capacitor 66 and quadrature field winding 67. The function of the quadrature field winding is described under the discussion of Fig. 5 and in addition, reduces the capacitor size because of the increased inductance of the circuit.

Control fields 68 and 69 are excited from the line 64 and 65 and are arranged in a regulatory circuit similar to that described in United States Patent No. 2,270,709 to Frank W. Merrill and assigned to the assignee of this application. Capacitors 70 and 71 tune the control field windings 68 and 69 respectively and resistor 72 serves to reduce the line voltage to the level necessary for the control circuit. Connected across the control field winding 69 and the capacitor 71 are the contacts of a speed governor 73 rotated by the motor. This may be any well known type of contact governor such as described in United States Patent No. 1,795,240 to Ulmer and assigned to the assignee of this application.

In certain instances, the impulses produced by the opening and closing of the governor contacts will be objectionably large and a conventional arc suppressing circuit consisting of resistor 74, and resistor and capacitor 75 and 76 respectively are provided to reduce these impulses.

The control field windings 68 and 69 are arranged so as to produce flux substantially equal and opposite as shown by the arrows 77 and 77', these arrows representing the instantaneous relationship of flux for any given polarity or half cycle of the alternating current of line 64 and 65. In operation with the motor at rest and the contacts open of regulator 73 open, current will flow from the line 64 and 65 through the compensating field windings 61 and 62, the armature between the direct axis brushes 59 and 60, and the series starting field 63. The compensating windings 61 and 62 produce a flux substantially equal and opposite to the direct axis armature reaction flux, thereby substantially neutralizing the direct axis armature reaction, and the control fields 68 and 69 will produce substantially equal and opposite fluxes with a resultant control flux of zero. The motor therefore starts as an ordinary series motor under the influence of series starting winding 63, the initially strong series field decreasing rapidly with increasing speed with a resultant rapid acceleration of the motor. When the speed setting of the governor 73 is reached, its contacts close short-circuiting control field 69. Control field 68 is then unopposed and will therefore send control flux through the armature inducing a voltage between the quadrature brushes 57 and 58 and producing the resultant heavy quadrature armature current which in turn produces the heavy quadrature armature reaction flux which is in the same direction as that due to the series field 63. This quadrature armature reaction flux coacts with the current flowing in the direct axis circuit from the line thus producing the output motor torque. The motor is now operating as an amplidyne machine and the rapid response to the excitation from the control field 68 will rapidly reduce the motor speed. When the speed of the motor falls below the speed setting of the regulator 73, the contacts will open reinserting control field 69 in the circuit to continue the speed control cycle. In operation, the contacts of the regulator vibrate very rapidly thus maintaining smooth speed control. Since the time constant in an amplidyne motor is inherently very low, the speed regulator produced by this circuit will be extremely accurate.

Referring now to Fig. 10, there is shown a stator member 78 for an amplidyne machine, illustrating the physical arrangement of the various windings referred to above. Here, the stator is provided with teeth 79 and winding slots 80 interspaced therebetween, the teeth being arranged to provide two polar salients. The control field coils 81 and 82 are usually formed of a large number of turns of fine wire, each coil being arranged to surround a slotted polar salient, but not being placed in the slots. There is usually only one control coil per pole, however, from a circuit standpoint, each taped coil may contain several different control fields. In any event, however, the two control field windings, respectively arranged on the two poles, are of course connected in series to constitute the complete control field winding.

The quadrature winding is also divided into two coils, 83 and 84 each coil embracing both poles and arranged respectively in the winding slots immediately adjacent the direct axis. There is one compensating field coil per pole, the two coils 85 and 86 being respectively connected to the two direct axis brushes in the usual construction. Each coil is wound concentrically in the pole winding slots and generally consists of a small number of turns of coarse wire.

A small alternating current amplidyne generator arranged as shown in Fig. 4 has been made to produce an output of substantially 400 cycles at 3600 R. P. M. The machine used in this test was especially useful for operation as an alternating current amplidyne generator because of its thin rotor and stator laminations, both sets of laminations being .010" iron. With these thin punchings, an effective resistance was obtained, on 60 cycles, of only approximately four times the direct current resistance. The stator punchings of this generator were $5\frac{1}{16}$" outside diameter and 3.27" inside diameter. The rotor was 3.25" outside diameter giving a .010" single airgap, and both rotor and stator were stacked to $1\frac{7}{8}$". The rotor was provided with 24 slots and had 48 coils of $4\frac{1}{2}$ turns per coil of .0453" wire with 2 coils per slot. The resistance of the armature winding between diametrically opposite points was .27 ohm at 25° C. The commutator was connected so as to bring in the neutral, i. e., the point of maximum generated voltage of the rotor, but of lowest generated voltage between the commutator bars, on the center line of the direct axis.

The stator windings were arranged as shown in Fig. 10, except with the quadrature winding omitted, the control field winding 9 consisting of two coils 81 and 82, one on each pole connected in series with 1000 turns per coil of .010" wire. The total direct current resistance of the control field winding was 300 ohms. The compensating field winding 15 had two sets of concentric coils 85 and 86, each set in series with 16 turns around the middle tooth, 12 turns around three teeth, 13 turns around 5 teeth, and 14 turns around seven teeth, the continuous winding being of .0571" wire. The commutator of this machine was $1\frac{1}{2}$" diameter with all four brushes $\frac{3}{32}$" thick, each brush spanning only one rotor coil. The tuning of this machine was accomplished by utilizing a 7 mfd. capacitor in the quadrature circuit and 100 mfd. in the direct axis circuit.

Another small alternating current generator arranged as shown in Fig. 3, with the addition of a quadrature winding, when excited by 60 cycle alternating current produced 784 watts at 3700 R. P. M. This machine had stator laminations which were $8\frac{1}{16}$" outside diameter and 5.050" inside diameter. The outside diameter of the rotor was 5.0" giving a single air gap of .025", the stacking of the rotor and stator was $5\frac{1}{2}$" and thickness of the laminations .025". The rotor had 24 winding slots with 72 coils of .0571" wire with three coils per slot, there being 5 turns per coil. The quadrature winding had two coils with 20 turns per coil of .0403" wire. The control field comprised two coils of 500 turns per coil of .179" wire. The compensating field consisted of two coils of .0571" wire, each coil having 32 turns around the middle tooth, 20 turns around 3 teeth, 30 turns around 5 teeth and 24 turns around 7 teeth. In this machine, the quadrature circuit was tuned with a 50 mfd.

The machine described above was operated as a motor on 60 cycles and produced an output of $1\frac{1}{3}$ H. P. at 3200 R. P. M. with 70% efficiency and 94% power factor. The circuit used in this test was substantially that shown in Fig. 9, however, without the speed regulator circuit.

From the above description, it will be apparent that there are many applications for an alternating current amplidyne generator or motor. It is possible by utilizing the tuning system described above to generate a low frequency alternating current by an alternating current amplidyne generator operating at high speed, thus removing the handicap of increased size to obtain a low frequency. Conversely, a high speed alternating current amplidyne motor can be operated from a low frequency source. By virtue the inherently low excitation requirement of an alternating current amplidyne machine, extremely accurate speed or voltage regulation is possible with low energy regulators operating in the control field. In addition, an inaccurate frequency supply can be converted to a highly accurate frequency by driving an alternating current amplidyne generator by a conventional induction motor operated on the inaccurate frequency supply. Since an alternating current amplidyne motor is capable of considerable range of speed by varying the voltage applied to the control field, and adjustable speed motor can be provided for 60 cycle operation having starting torque and speed regulation comparable to its counter-part direct current adjustable speed motor. Moreover a number of alternating current amplidyne generators can be operated in parallel without the necessity of running them at the same speed since the frequency output can be controlled by the same master frequency source.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine of the armature reaction excited type having a stationary member and a rotatable member provided with a commutator, a set of primary brushes and a set of secondary brushes electrically displaced from said primary brush set adapted to provide a primary and a secondary circuit respectively through said rotatable member, a field exciting circuit including a field exciting winding for controlling the secondary characteristics of said machine a second field exciting winding for substantially neutralizing the armature reaction produced by current in said secondary circuit, capacitor means in series with each of said primary and said field exciting circuits for substantially neutralizing the inductive reactance thereof.

2. A dynamoelectric machine of the armature reaction excited type having a stationary member and a rotatable member provided with a commutator, a set of primary brushes and a set of secondary brushes electrically displaced from said primary brush set adapted to provide a primary and a secondary circuit respectively through said rotatable member, a field exciting circuit including a field exciting winding for controlling the secondary characteristics of said machine, a second field exciting winding for substantially neutralizing the armature reaction produced by current in said secondary circuit, and capacitor means in each of said primary and said field exciting circuits for substantially neutralizing the inductive reactance thereof.

3. A dynamoelectric machine of the armature reaction excited type having a stationary member and a rotatable member provided with a commutator, a set of primary brushes and a set of secondary brushes electrically displaced from said primary brushes adapted to provide a primary and a secondary circuit respectively through said rotatable member, a circuit including a field exciting winding for controlling the secondary characteristics of said machine, a second field exciting winding for substantially neutralizing the armature reaction produced by current in said secondary circuit, and capacitor means in each of said circuits for substantially neutralizing the inductive reactance thereof.

4. A dynamoelectric machine of the armature reaction excited type having a stationary member and a rotatable member provided with a commutator, a set of primary brushes and a set of secondary brushes electrically displaced from said primary brush set adapted to provide a primary and a secondary circuit respectively through said rotatable member, a circuit including a field exciting winding for controlling the secondary characteristics of said machine, a second field exciting winding for substantially neutralizing the armature reaction produced by current in said secondary circuit, and capacitor means in series with each of said circuits for substantially neutralizing the inductive reactance thereof.

WILLIAM A. PRINGLE.

REFERENCES CITED

The following references are of record in the file of this patent:

UNITED STATES PATENTS

| Number | Name | Date |
| --- | --- | --- |
| 1,374,565 | Hellmund | Apr. 12, 1921 |

FOREIGN PATENTS

| Number | Country | Date |
| --- | --- | --- |
| 2,677 | Great Britain | 1907 |
| 560,180 | Great Britain | Oct. 21, 1940 |

OTHER REFERENCES

"Design Characteristics of Amplidyne Generators," by Alec Fisher, General Electric Review, vol. 43, No. 3, pp. 107–113.